United States Patent
Kustov et al.

(10) Patent No.: US 7,162,535 B2
(45) Date of Patent: Jan. 9, 2007

(54) METHODS AND ARRANGEMENTS FOR PROVIDING EFFICIENT INFORMATION TRANSFER OVER A LIMITED-SPEED COMMUNICATIONS LINK

(75) Inventors: Andrei Kustov, Espoo (FI); Olli Auvinen, Helsinki (FI); Mikko Hämäläinen, Espoo (FI); Hannu Kari, Veikkola (FI); Victor Khachtchanski, Helsinki (FI); Juha Koponen, Helsinki (FI); Hannu Mallat, Espoo (FI); Juhana Räsänen, Espoo (FI)

(73) Assignee: First Hop Oy, Espoo (FI)

( * ) Notice: Subject to any disclaimer, the term of this patent is extended or adjusted under 35 U.S.C. 154(b) by 829 days.

(21) Appl. No.: 10/099,296

(22) Filed: Mar. 14, 2002

(65) Prior Publication Data

US 2002/0138565 A1 Sep. 26, 2002

(30) Foreign Application Priority Data

Mar. 26, 2001 (FI) .................................. 20010619

(51) Int. Cl.
*G06F 15/16* (2006.01)

(52) U.S. Cl. ........................ 709/235; 709/225; 709/226

(58) Field of Classification Search ................ 709/225, 709/226, 229, 246, 248, 235

See application file for complete search history.

(56) References Cited

U.S. PATENT DOCUMENTS

| | | | |
|---|---|---|---|
| 6,115,384 A | 9/2000 | Parzych ...................... 370/401 |
| 6,587,441 B1 * | 7/2003 | Urban et al. ................ 370/310 |
| 6,675,017 B1 * | 1/2004 | Zellner et al. ......... 379/142.02 |
| 6,738,630 B1 * | 5/2004 | Ashmore .................. 455/456.3 |
| 6,810,405 B1 * | 10/2004 | LaRue et al. ............... 707/201 |
| 6,865,171 B1 * | 3/2005 | Nilsson ...................... 370/338 |
| 6,934,532 B1 * | 8/2005 | Coppinger et al. ...... 455/412.1 |

OTHER PUBLICATIONS

L. Huovinen, Helsinki Univ. of Technology, "Improving Quality of Service on Slow and High Error Rate Links," (Nov. 1999, pp. 1-7, Helsinki, Finland).

* cited by examiner

*Primary Examiner*—Ario Etienne
*Assistant Examiner*—Sargon N. Nano
(74) *Attorney, Agent, or Firm*—Milton Oliver, Esq.; Ware Fressola Van Der Sluys & Adolphson LLP

(57) ABSTRACT

Methods and arrangements are disclosed for transferring digital data over a limited speed communications link between a client side subarrangement (401) and a server side subarrangement (402). Within the client side subarrangement (401), a client application (411, 502) receives and transmits digital data using a first communications protocol stack (412, 503, 504, 505) and, within the server side subarrangement (402), a server application (426, 572) receives and transmits digital data using the first communications protocol stack (425, 573, 574, 575). Digital data is transferred between the client application (411, 502) and the server application (426, 572) through a client proxy (511) within the client side subarrangement (401) and an access gateway (551) within the server side subarrangement (402). Said client proxy (511) performs protocol conversations between the first communications protocol stack (412, 503, 504, 505) and a second communications protocol stack (415, 521, 522, 523, 524, 525, 526) that provides a bandwidth efficiency that is better than a bandwidth efficiency to which the first communications protocol corresponds.

52 Claims, 10 Drawing Sheets

METHODS AND ARRANGEMENTS FOR PROVIDING EFFICIENT INFORMATION TRANSFER OVER A LIMITED-SPEED COMMUNICATIONS LINK

CROSS-REFERENCE TO RELATED APPLICATIONS

Priority is claimed from Finnish application 20010619 filed 26 Mar. 2001.

TECHNICAL FIELD

The invention concerns generally the field of transferring information over a limited speed communications link, which typically involves a wireless network connection. Especially the invention aims at providing efficiency to such information transfer. Efficiency is construed to have a manifestation in relatively short delays observed by a user, as well as in the possibility of distributing the transmission resources of a communications link among a relatively large number of simultaneous connections.

BACKGROUND OF THE INVENTION

At the priority date of this patent application information transfer between computers over wired or optically coupled networks has become a vital part of everyday life. A vast majority of such information transfer takes place according to or at least takes some partial advantage of various versions of the TCP/IP (Transmission Control Protocol/Internet Protocol), as is illustrated in FIG. 1. In a simple case there are two communicating parties, known as the client 101 and the server 102. The former is the device or arrangement that a user utilizes to download and use information and store it locally, while the latter is a kind of central data storage from which information is to be downloaded. Both the client 101 and the server 102 set up a so-called protocol stack where information is exchanged in the conceptually vertical direction. Layers that are on the same level in the client and the server constitute the so-called peer entities that communicate with each other through all lower layers in the protocol stacks. On top of the pairs of IP layers 103 and TCP layers 104 there may be further higher layers. An example of a protocol layer that is widely used directly above the TCP layer is the HTTP (HyperText Transfer Protocol) that is meant for the transmission of files written in markup languages like HTML (HyperText Markup Language). Other examples of widely used higher protocol layers that in the layer hiearchy are level with HTTP are FTP (File Transfer Protocol), Telnet and SMTP (Simple Mail Transfer Protocol; not shown). The layers that are below the IP layer 103 are not specifically shown in FIG. 1; the person skilled in the art is well aware of those possible lower layers that are used in various communication solutions.

The basic model of two-party communications shown in FIG. 1 contains an inherent assumption that the transmission capacity of all stretches of the communication connection is essentially the same. However, in many real life communication connections there is a certain passage over which only a limited transmission capacity is available. In this patent application we will refer to such a capacity-restricted passage as the limited speed communications link. The transmission capacity that is available for communications over the limited speed communications link determines the overall maximum bit speed that can be obtained in the communication connection between the endpoints of the connection.

Extending the techniques known from wired information transfer into a connection that includes a wireless link, such as a radio connection between a base station and a portable terminal, introduces new aspects that a user is likely to encounter in the form of lower bit rates and increased delays. These are mainly related to two interconnected features of the wireless link in comparison with wired or optically coupled links: inherently lower reliability (i.e. higher susceptibility to transmission errors), which leads to frequent retransmissions, and radio link congestion because a base station can only maintain a limited number of simultaneous connections. These factors together cause the wireless passage often to be the limited speed communications link of a communication connection. In the following we will mainly describe the properties and characteristics of wireless links; the invention has, however, also wider applicability in all kinds of communication connections where a certain passage between two devices limits the overall achievable performance in a connection extending further than just these two devices.

The TCP/IP-based technique of transferring information is not particularly well suited for wireless information transfer. As an example we may consider a typical case of web browsing, where HTTP is used over TCP/IP in a communication connection that goes over a wireless link. Factors that cause the wireless link resources to be wasted to a relatively great extent are:

sending the bulk of the contents from web servers (HTML pages) as plain text;
  the multitude of requests: at least in HTTP 1.0 a separate request is issued for every item (e.g. a picture) that exists on a page, so that because TCP in turn establishes a separate connection for every request, there may easily be as many requests as there are items to be downloaded;
  the 3-way handshake procedure, i.e. a pair of non-payload messages exchanged between the client and the server, involved in each TCP connection; and
  sending the HTML page most often in several packets so that TCP sends an acknowledgement for every one of them.

A solution that has become reality around the priority date of this patent application is WAP (Wireless Application Protocol). It is a bandwidth-optimized alternative to protocols that are not so optimized, such as the TCP/IP. Optimization involves measures like omitting redundant messages and replacing repeatedly occurring well-known tags with shortened codes. Optimization in this sense aims at the highest possible bandwidth efficiency, which itself has a definition as the ratio of the information transmission rate (the number of information bits transmitted per second) and the bandwidth in Hertz that is allocated for transmitting said information. Bandwidth efficiency measures (not surprisingly) how efficiently the communications system uses the available bandwidth.

The WAP protocol stacks are illustrated in FIG. 2, where the actual WAP layers are, from top to down, the application layer 201 (WAE, Wireless Application Environment), the session layer 202 (WSP, Wireless Session Protocol), the transaction layer 203 (WTP, Wireless Transaction Protocol), the security layer 204 (WTLS, Wireless Transport Layer Security Protocol) and the transport layer 205 (WDP, Wireless Datagram Protocol). In place of the WDP layer an UDP (User Datagram Protocol) layer must be used for IP bearers. Beneath the transport layer 205 there are further lower layers like IP 206 and physical layers 207; together these are also commonly referred to as the bearer layers.

WAP was developed to enable access to networked information from devices that have the typical features of wireless terminals, i.e. limited CPU (Central Processing Unit) capacity, limited memory size, battery-powered operation and simple user interface. The commercial applications of WAP that exist at the priority date of this patent application are the so-called WAP phones that combine the features of a mobile telephone with certain limited functionality of a web browser. In practice we have seen that the small number of WAP users compared to that of wired Internet users is a major drawback that reduces the commercial interest in setting up WAP services, especially at the advent of third generation digital cellular networks. Moreover, already due to the introduction of the first phase of packet-switched cellular data networks using GPRS (General Packet Radio Service) the need of wireless access for full-fledged mobile clients is expected to grow considerably. WAP is not suitable for providing that, so there have been devised various proprietary solutions for wireless data transfer.

As an example of the last-mentioned FIG. 3 illustrates the so-called MOWGLI concept (Mobile Office Workstations using GSM Links) where a mobile workstation 301 utilises a wireless link between a GSM (Global System for Mobile telecommunications) cellular phone 302 and a GSM base station 303 to communicate with what is called a mobile-connection host 304. In the mobile workstation 301 old applications 311 and 312 communicate with agent programs 313, 314 and 315 through an application programming interface known as the Mowgli Socket API 316. From the agents there is a connection to a Mowgli Data Channel Service API 317 and the associated Mowgli Data Channel Service 318 either directly or through a Mowgli Data Transfer Service API 319 and the associated Mowgli Data Transfer Service 320. New mobile applications 321 may have been designed to communicate directly (through the appropriate API) with either the Mowgli Data Transfer Service 320 or the Mowgli Data Channel Service 318. A control tool 322 is included for controlling the operation of the other program components. A wireless interface block 323 constitutes the connection from the mobile workstation 301 to the cellular phone 302.

In the mobile-connection host 304 there are counterparts for certain entities implemented in the mobile workstation 301: a wireless interface block 331, a Mowgli Data Channel Service 332 with its associated API 333 as well as a Mowgli Data Transfer Service 334 with its associated API 335. A number of proxies 336, 337, 338 and 339 may act in the mobile-connection host 304 as counterparts to the agent programs 313, 314 and 315 in the mobile workstation 301. An arrangement of a socket API 341, a TCP/UDP layer 342 and an IP or mobile IP layer 343 constitute, together with a network interface 344, a connection from the mobile-connection host 304 further to a LAN 345 or a similar network. Under the IP or mobile IP layer 343 there may also be a virtual network interface 346.

The division of the MOWGLI architecture into Agent/Proxy-, Data Transfer- and Data Transport layers is shown with heavy dotted lines in FIG. 3. Of the protocols used therein, between an agent and a proxy (like the master agent 314 at the mobile workstation 301 and the master proxy 338 at the mobile-connection host 304) there is a Mowgli Socket protocol, between the mutually corresponding MDTS entities 320 and 334 there is a Mowgli Data Transfer protocol and between the mutually corresponding MDCS entities 318 and 332 there is a Mowgli Data Channel protocol.

SUMMARY OF THE INVENTION

As a consequence of the existence of a multitude of protocols described above, the problem of providing efficient and widely usable information transfer over a wireless network connection remains unsolved at the priority date of this patent application. It is therefore an object of the invention to provide a method and an arrangement for providing efficient and widely usable information transfer over a wireless network connection. It is also an object of the invention to provide a method and an arrangement for enhancing the level of service that a human user of a wireless network connection experiences. It is a further object of the invention to provide extendability to a wireless network link so that minimal software and hardware additions would be needed to widen the selection of transmission protocols that can be used for wireless network access.

The objects of the invention are achieved by setting up a pair of functional entities that comprise protocol converters and additional modules. These functional entities are placed at each end of a wireless communication connection. They make a transparent conversion to a bandwidth-optimized wireless protocol for information to be transmitted wirelessly and a corresponding reverse conversion for information that has been received wirelessly.

The invention applies to a method the characteristic features of which are recited in the characterising portion of the independent patent claim directed to a method. The invention applies also to an arrangement the characteristic features of which are recited in the characterising portion of the independent patent claim directed to an arrangement. The characteristic features of other aspects of the invention are recited in the characterising portions of the respective independent patent claims.

The present invention has its roots in the contradictory situation where those protocols that have been most widely used for transferring data over network connections are not bandwidth-optimized while some other protocols that are were only developed for a narrow application area or have not gained too much popularity. In a method and arrangement according to the invention there is a bandwidth-optimized link portion located at that point of a wireless network connection that covers the radio interface. Both the user's application at the client end of the connection and the server application may be designed for a different protocol, and indeed they may remain completely unaware about the fact that a different (bandwidth-optimized) protocol is used for a part of the network connection. A protocol converter at the client end and another at the network end of the bandwidth-optimized link portion perform the necessary protocol conversions to and from the bandwidth-optimized protocol. The protocol for which the user's application and the server application have been designed is typically some widely used network communication protocol. At the priority date of this patent application such widely used network communication protocol is typically TCP/IP, while the bandwidth-optimized protocol is typically WAP.

Various advantageous features can be used in the additional modules to enhance the efficiency of the arrangement from that of a simple protocol conversion. Most advantageously the client proxy, which is the device and/or process that is responsible for the connection and protocol conversions at the client side, has a cache memory where it stores a copy of data that has been requested and downloaded from the server side. If the same data is then needed again, it suffices to check whether there have been any changes to it since it was last downloaded. No changes means that a new downloading operation over the radio interface is completely avoided. Even if there have been changes it suffices to download only the changed data instead of the whole contents of a requested data entity. The client proxy may even have a background connection to the server side over which changes and updates to recently downloaded and cached data are transmitted automatically in preparation for the potentially occurring need for an updated version at the client side.

A further development to the idea of simple caching is predictive caching, which means that the client proxy follows either certain regularities in the behaviour of the user or certain preprogrammed instructions (or both) and proactively downloads data that the user is likely to need during a certain time period to come. Similarly as in the difference caching referred to above, the predictive caching arrangement may have a background connection to the server side so that while the user is doing something else, the client proxy may prepare for the predicted need of certain data by downloading it from the network. Predictive caching is easily combined with difference caching so that in preparation for the potential need of certain predictively downloaded data the client proxy receives changes and updates to said data according to certain updating rules.

An effective way of achieving efficiency is to enable the functional entities at the ends of the wireless communication connection to multiplex separate logical connections into one connection. The multiplexed logical connections may include representatives from both those established by the mobile client software and those related to the above-described caching processes.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIGS. 1, 2 and 3 were described above within the description of prior art, so the following description of the invention and its advantageous embodiments will focus on FIGS. 4 to 10.

DETAILED DESCRIPTION OF THE INVENTION

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

Figure 1:
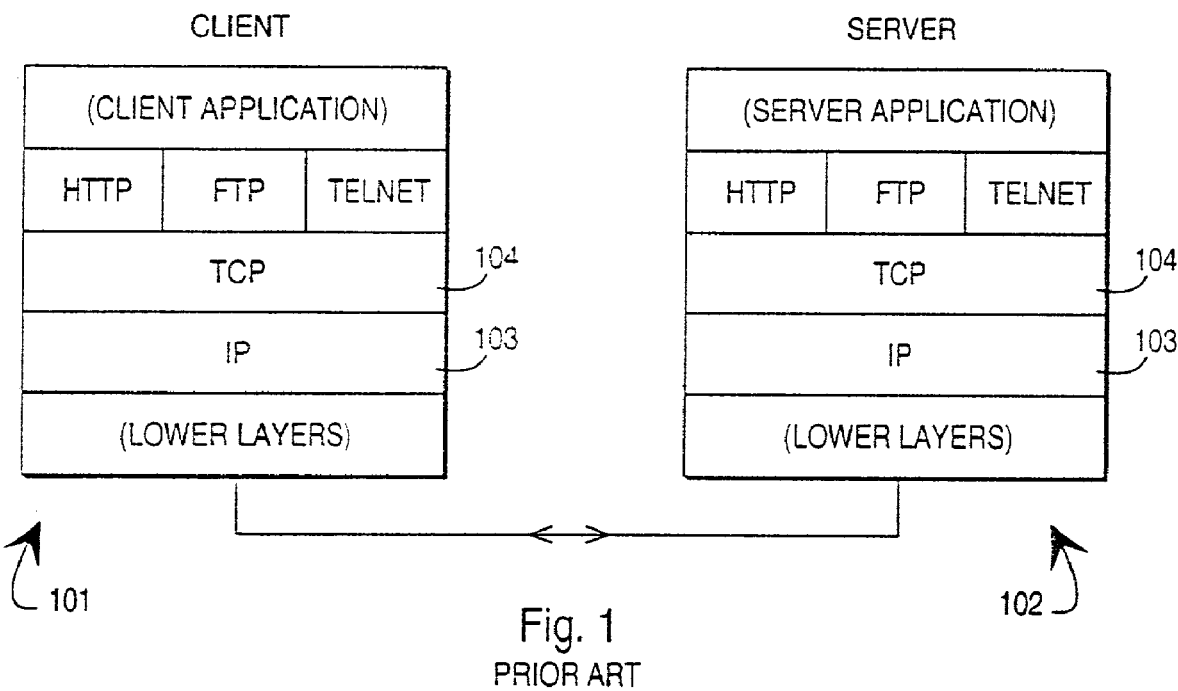
FIG. 1 illustrates the known use of TCP/IP in a client/server connection.
Figure 2:
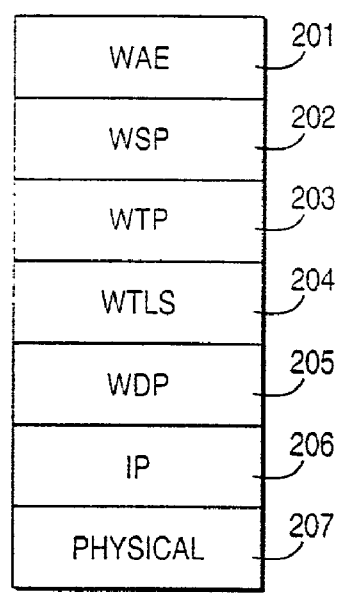
FIG. 2 illustrates the known use of WAP in a wireless network connection.
Figure 3:
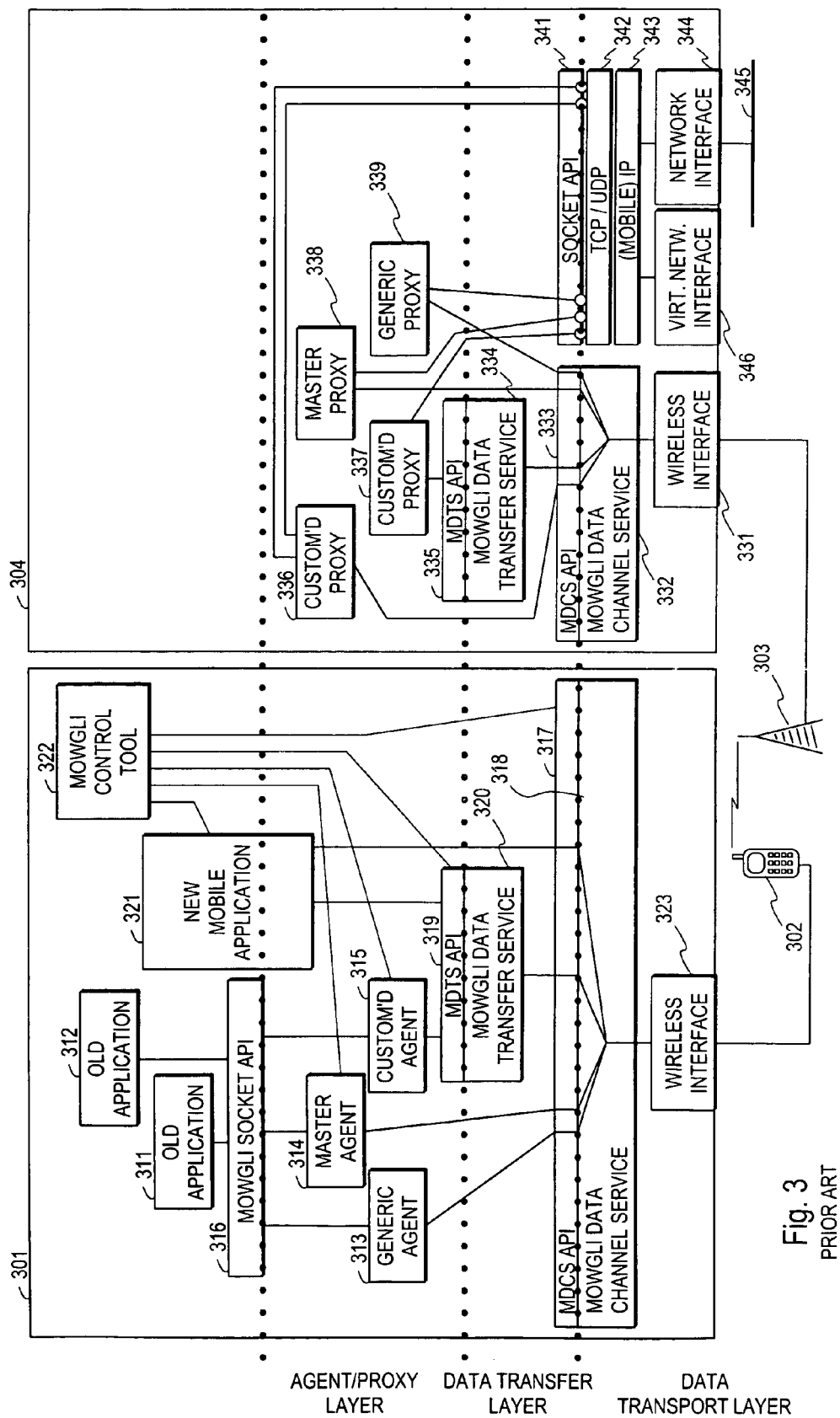
FIG. 3 illustrates the known Mowgli architecture.
Figure 4:
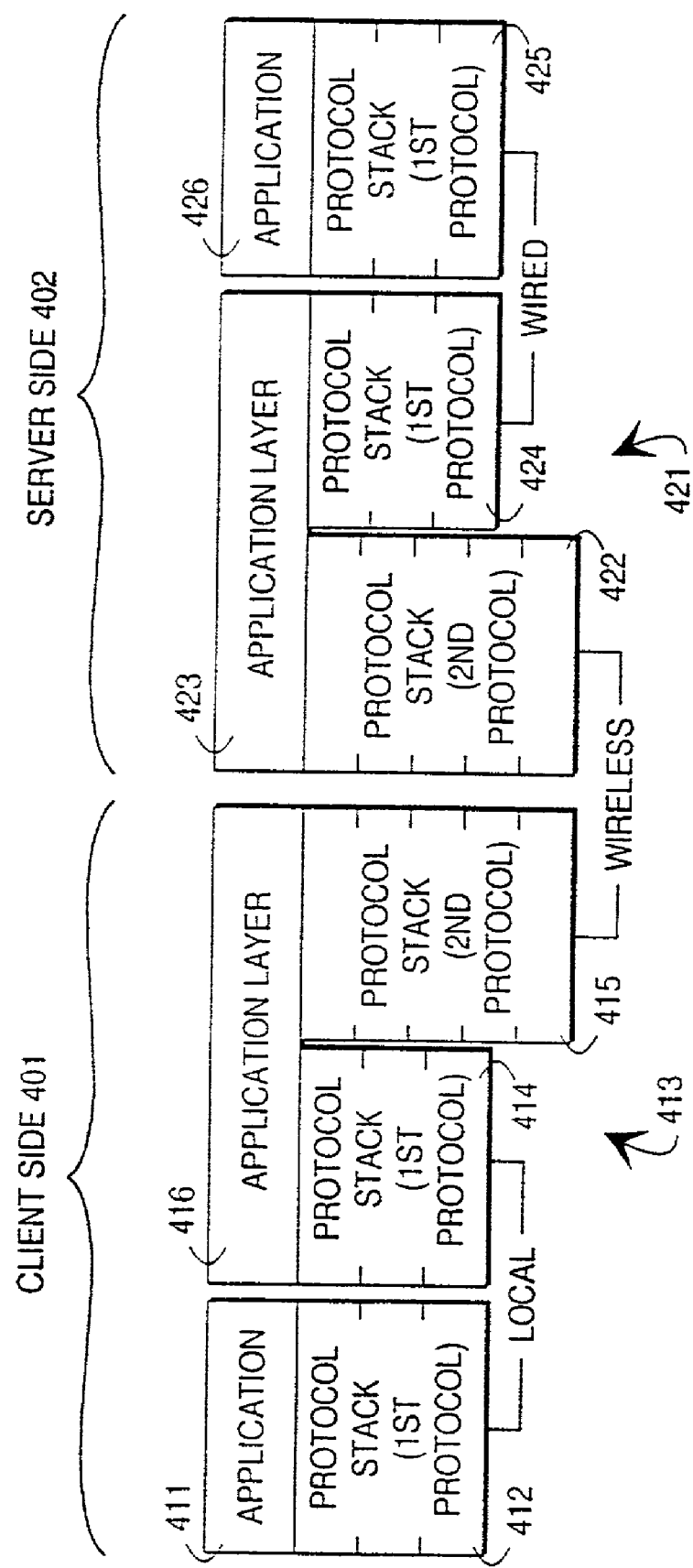
FIG. 4 illustrates the principle of transparent intermediate protocol conversion.

FIG. 4 illustrates the principle of a method and an arrangement where a first communicating party 401, designated here as the client side, has a wireless network connection to a second communicating party 402, which is here designated as the server side. It should be easy to appreciate the fact that the designations "client" and "server" are used for the sake of example only and do not limit the applicability of the invention regarding communication connections between different kinds of devices. Especially both the client side and the server side may comprise any number of mutually coupled individual devices.

At the client side there is an application 411 that has been designed to use a first communications protocol stack, which is shown as 412. A characteristic feature of the first communications protocol stack is that it is not bandwidth-optimized and therefore not optimal for communications over a wireless link. For this reason there is at the client side a client-side proxy 413 where the first communications protocol stack 414 is linked, at a certain relatively high level, to a second communications protocol stack 415. Contrary to the first communications protocol stack the second communications protocol stack is bandwidth-optimized. The link between the stacks 414 and 415 constitutes another application layer 416 that should not be confused with the application 411 that is the actual user of information transferred over the network connection. Note that the invention does not place limitations to the number of physically separate devices that are used to set up the client side: it is possible to run the application 411 and the client-side proxy 413 in one and only device, while it is just as possible to have at least two physically separate devices to implement these functions.

On the server side 402 there is an access gateway 421 where the part that faces the client side 401 comprises a peer entity stack 422 for the second communications protocol stack 415 at the client side. On top of said peer entity stack 422 there is a server side applications layer 423 from which there are couplings further into one or more fixed networks. As an example there is shown in FIG. 4 a pair of protocol stacks 424 and 425 as well as a network application 426 that complete the server side as a mirror image of the client side: the stacks 424 and 425 conform to the first communications protocol introduced above. If the application 411 at the client side would be running in an ordinary terminal of a wired network, it would use directly and exclusively the first communications protocol stack to communicate with the network application 426. We will describe later certain alternative forms of further couplings from the server side applications layer 423.

In order to take full advantage of the invention, the client-side proxy 413 and the access gateway 421 should not be just unintelligent protocol converters. According to the invention the application layers 416 and 423 contain a set of modules, which can greatly improve the efficiency of information transfer.

Figure 5:
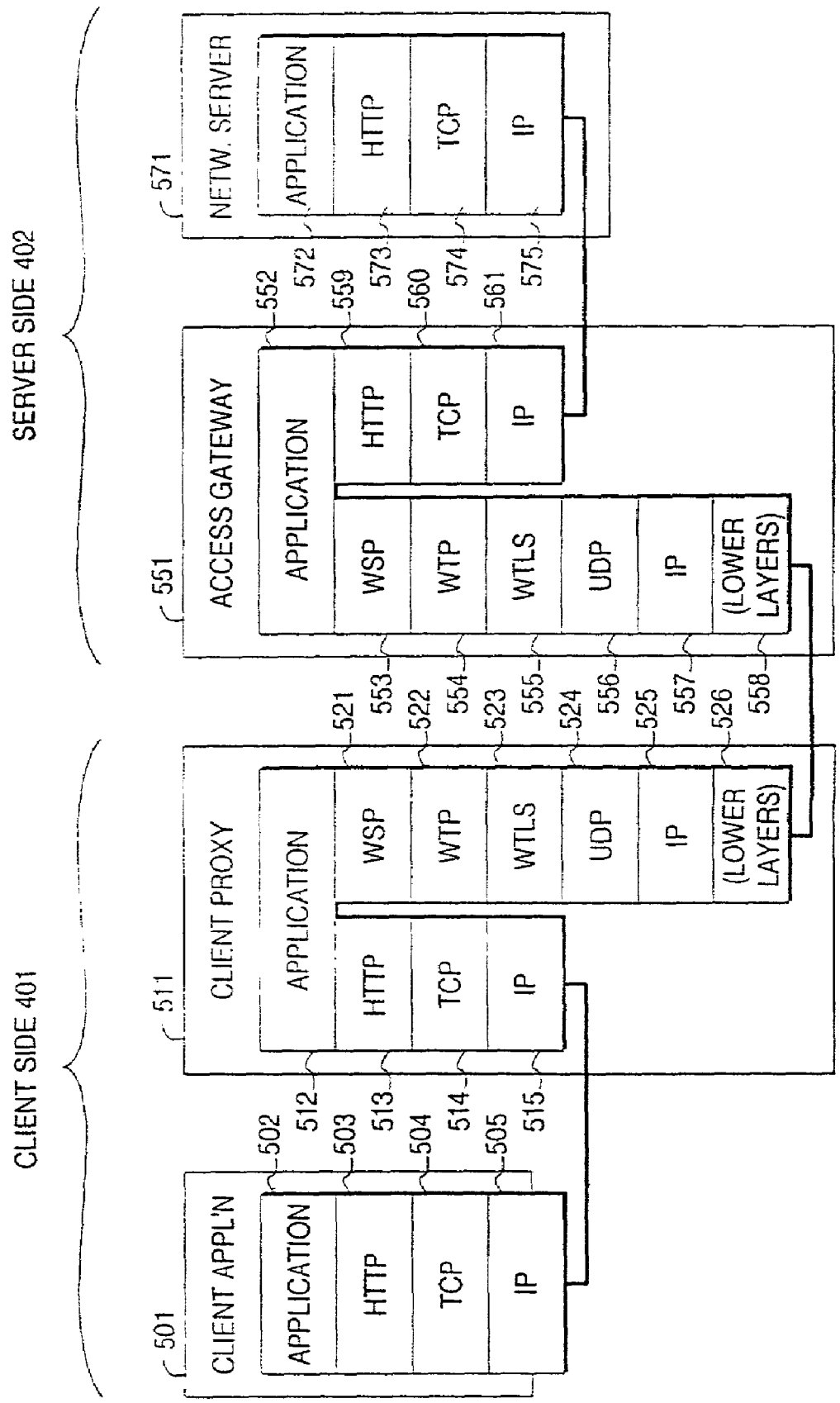
FIG. 5 illustrates an advantageous architecture for the client proxy.

FIG. 5 is a more detailed exemplary embodiment of the principle shown above in FIG. 4. Here the client side 401 consists of a client application 501 and a client proxy 511, and the server side 402 consists of an access gateway 551 and a WWW-server 571. In the embodiment of FIG. 5 the first and second communications protocol stacks have been selected according to high prevalence in use at the priority date of this patent application: the first communications protocol stack is a combination of HTTP over TCP/IP, and the second communications protocol stack is WAP. Consequently the client application 501 has, from top to down, an application layer 502, an HTTP layer 503, a TCP layer 504 and an IP layer 505. At the top in the layer hierarchy of the client proxy 511 there is an application layer 512. Under it there are, from top to down on the side facing the client application, the HTTP 513, TCP 514 and IP 515 layers that constitute the peer entities for the similarly named layers in the protocol stack of the client application 501. In order to facilitate the establishing and maintaining of a physical communication connection between the client application 501 and the client proxy 511 there may be further lower layers below the pair of IP layers 505 and 515.

Under the client proxy's application layer 512 on the other side there are, from top to down, the WSP 521, WTP 522, WTLS 523, UDP 524 and IP 525 layers. Under the IP layer 525 there are further lower (radio link) layers 526 that have been dedicated to the physical implementation of a wireless network connection.

At the top in the layer hierarchy of the access gateway 551 there is another application layer 552. Under it on the side facing the client proxy there are, from top to down, the WSP 553, WTP 554, WTLS 555, UDP 556 and IP 557 layers as well as the schematically shown further lower layers' entity 558. These are easily recognized as the peer entities of the similarly named layers at the client proxy 511. On the other side under the access gateway's application layer 552 there are, from top to down, the HTTP 559, TCP 560 and IP 561 layers. The protocol stack of the network server 571 has once again an application layer 572 and under it the HTTP 573, TCP 574 and IP 575 layers that constitute the peer entities for the similarly named layers at the access gateway 551. In order to facilitate the establishing and maintaining of a physical communication connection between the access gateway 551 and the network server 571 there may be further lower layers below the pair of IP layers 561 and 575.

One of the tasks of the client proxy 511 is to make it completely transparent to the client application 501 that the network connection comprises a stretch where a completely different communications protocol stack is used. This has the advantageous consequence that the client application 501 can be of an off-the-shelf type known already at the priority date of this patent application. Thus the wide selection of already available client-side application programs can be used without making changes. When one "looks" at the client proxy 511 from the viewpoint of the client application 501, the client proxy 511 appears to function exactly like a network server. Next we will analyse an advantageous implementation architecture for the client proxy that aims at fulfilling this task.

Structure and Operation of the Client Proxy

Figure 6:
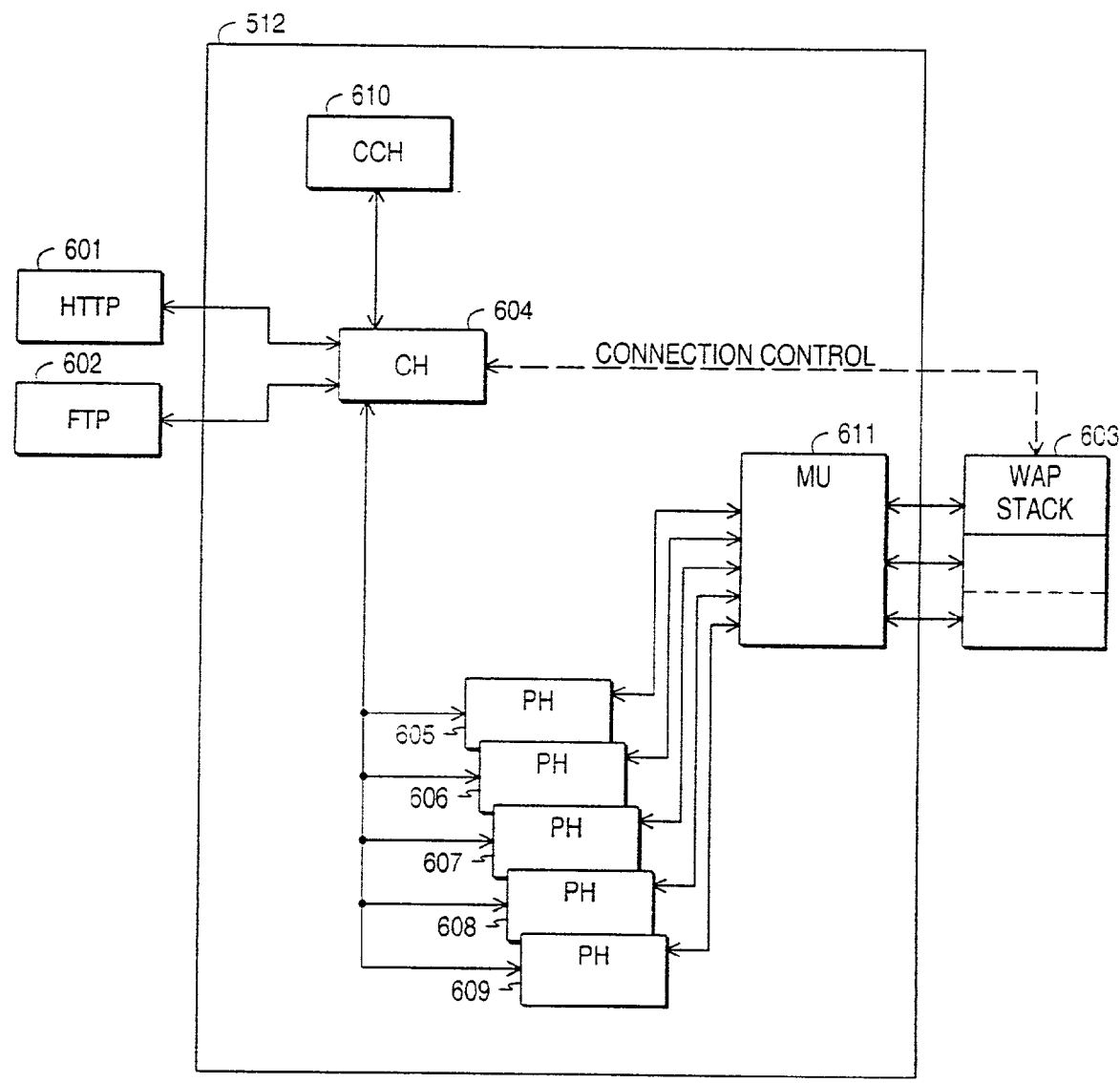
FIG. 6 illustrates an advantageous modular structure for the application layer of a client proxy.

FIG. 6 illustrates a schematical structure of an advantageous embodiment of the application layer 512 at the client proxy 511 of FIG. 5. The left-hand side of FIG. 6 illustrates the coupling(s) to the highest layer(s) of the first communications protocol stack: HTTP 601 and FTP 602 are examples. On the right-hand side there is the coupling to the second communications protocol stack, schematically shown as the WAP stack 603. Note that depending on the first communications protocol stack the coupling to the right from the application layer 512 does not need to concern only the highest WAP layer, i.e. the WSP layer. For example, if the left-hand coupling is with FTP the right-hand coupling can take place directly with the WTP layer, while a left-hand coupling with an HTTP client necessitates a right-hand coupling with the WSP layer.

The central functional module 604 in FIG. 6 is called the CH or Connection Handler. It has a bidirectional coupling with at least one PH (Protocol Handler); PHs 605 to 609 are shown in FIG. 6. The CH 604 has also bidirectional couplings with a CCH (Content Cache Handler) 610. The tasks of the CH 604 can be summarized as follows:

it receives requests from the client application through the first communications protocol stack,
  it recognizes the protocol that application 411 uses,
  it decides, whether the received requests can be satisfied by just reading previously stored data from the CCH 610 or whether a request must be forwarded over the wireless network connection to the access gateway,
  it calls, according to the recognized protocol, appropriate PHs 605-609 when necessary, and
  it controls the setting up, maintaining and tearing down of connections to the access gateway.

The CCH 610 is a local cache memory the primary task of which is to locally store certain information that according to a certain algorithm is likely to be requested by client applications. A simple strategy is to store previously requested information so that there is a maximum amount of memory allocated for caching: after the allocated memory becomes full, the content of the cache is discarded according to the chosen cache replacement policy. More elaborate strategies will be described in more details later.

Each PH 605–609 is associated with a client application protocol of its own. A PH contains protocol-specific instructions about how a request associated with the appropriate client application protocol should be processed before forwarding it over to the second communications protocol stack (the WAP stack 603 in the example of FIG. 6). The PH is also equipped to perform the corresponding actions as well as similar procedures that are to be applied to responses received from the WAP stack. Examples of the above said actions are the following:

binary encoding of uplink commands, headers and all other standard elements for all text based protocols, except when such binary encoding is already a part of the appropriate client application protocol or second communications protocol, and corresponding decoding for downlink data
  binary encoding of uplink tags of markup languages like HTML or XML (extended markup language), except when such binary encoding is already a part of the appropriate client application protocol or second communications protocol, and corresponding decoding for downlink data, and
  compression (for uplink) and decompression (for downlink) with appropriate algorithms for all kinds of payload information.

All PHs have couplings to the MU (Multiplexing Unit) 611, which has two main tasks:

multiplexing and demultiplexing of logical connections so that the number of separate connections to the access gateway is minimized, and
  uplink connections prioritizing according to priorities set by the CH.

Figure 7:
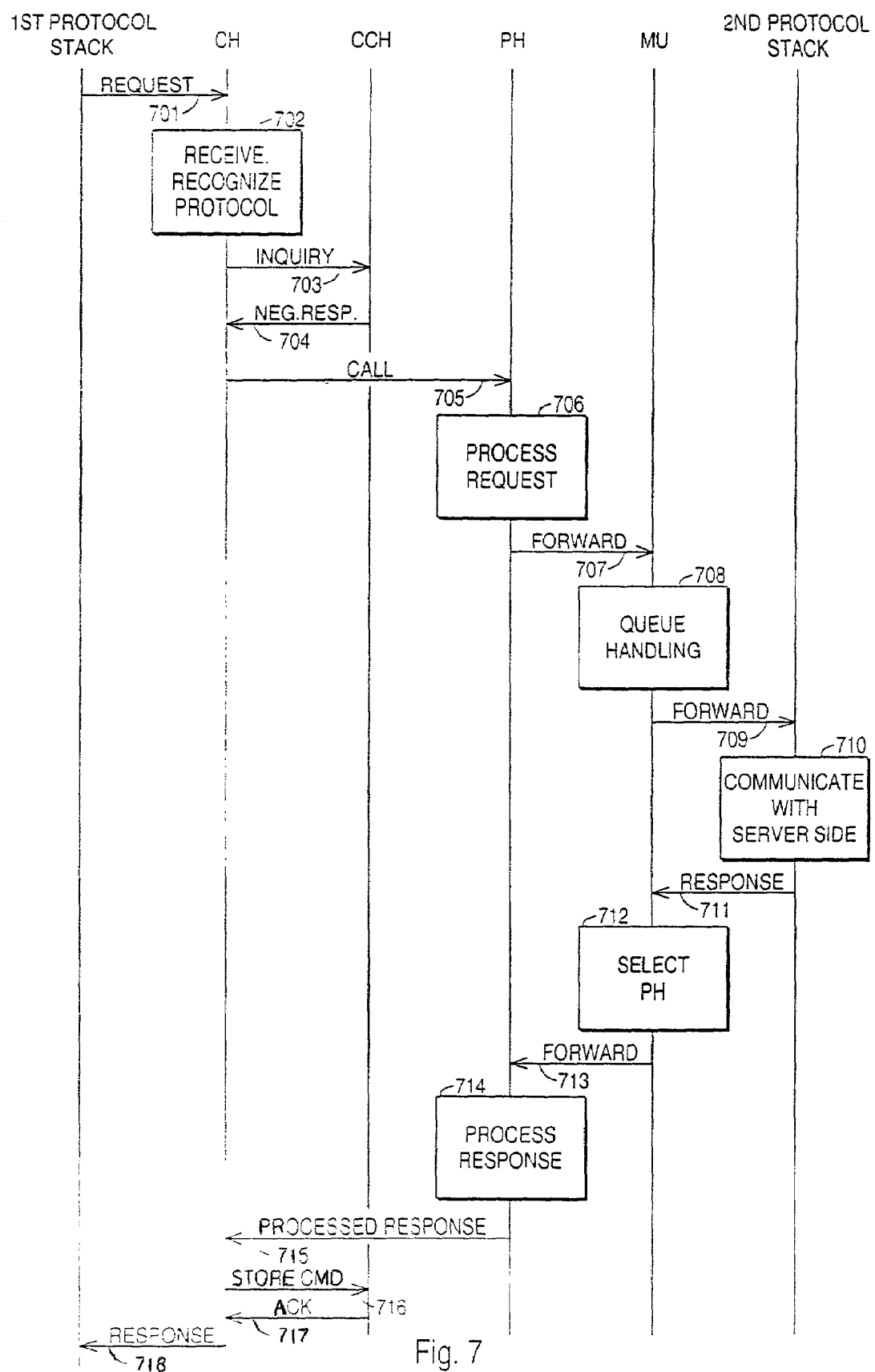
FIG. 7 illustrates the handling of a request at the client proxy according to an embodiment of the invention.

FIG. 7 illustrates the exchange of calls and messages within and between the entities shown in FIG. 6 in an exemplary case where a client application requests information that is to be downloaded from the network. At step 701 there comes a request from a client application through a first protocol stack. At step 702 the CH receives the request and analyzes it in order to at least recognize, through which one of the possibly several parallel first protocols it came.

At step 703 the CH sends an inquiry to the CCH in the hope that the requested information would already exist there as a previously stored copy. In FIG. 7 we assume that this is not the case, so the CCH responds at step 704 with a negative. Thereafter the CH uses its knowledge about the first protocol that was recognized at step 702 and calls the appropriate PH at step 705. The called PH processes the request at step 706 by performing operations, examples of which were given above, and forwards the request to the MU at step 707.

At step 708 the MU checks the priority of the request (priorities are assigned to every request by the CH). The MU communicates the processed request to the appropriate level in the second protocol stack at step 709.

Note that the processed request does not always go to the top layer of the second protocol stack: for example if the request came from the client application through HTTP, WSP must be used while an FTP request from the client application allows the WTP layer to be contacted directly.

Step 710 represents generally the phase in which the communication is carried out with the access gateway through the second protocol stack. At step 711 there arrives a response from the access gateway to the MU. The response must be subjected to reverse processing in the same PH that processed the request at step 706, so the MU decides at step 712 to which particular PH the response should be passed, and passes the request to that PH at step 713. At step 714 the response is processed by the PH, and at step 715 it arrives to the CH in a form that is ready to be passed on to the client application through the first communications protocol stack. We assume that the CH wants the information contained in the response to be stored into the CCH, so at step 716 the CH commands the CCH to store the response information. There may be an acknowledgement from the CCH at step 717. At step 718 the same information is forwarded towards the client application.

Figure 8:
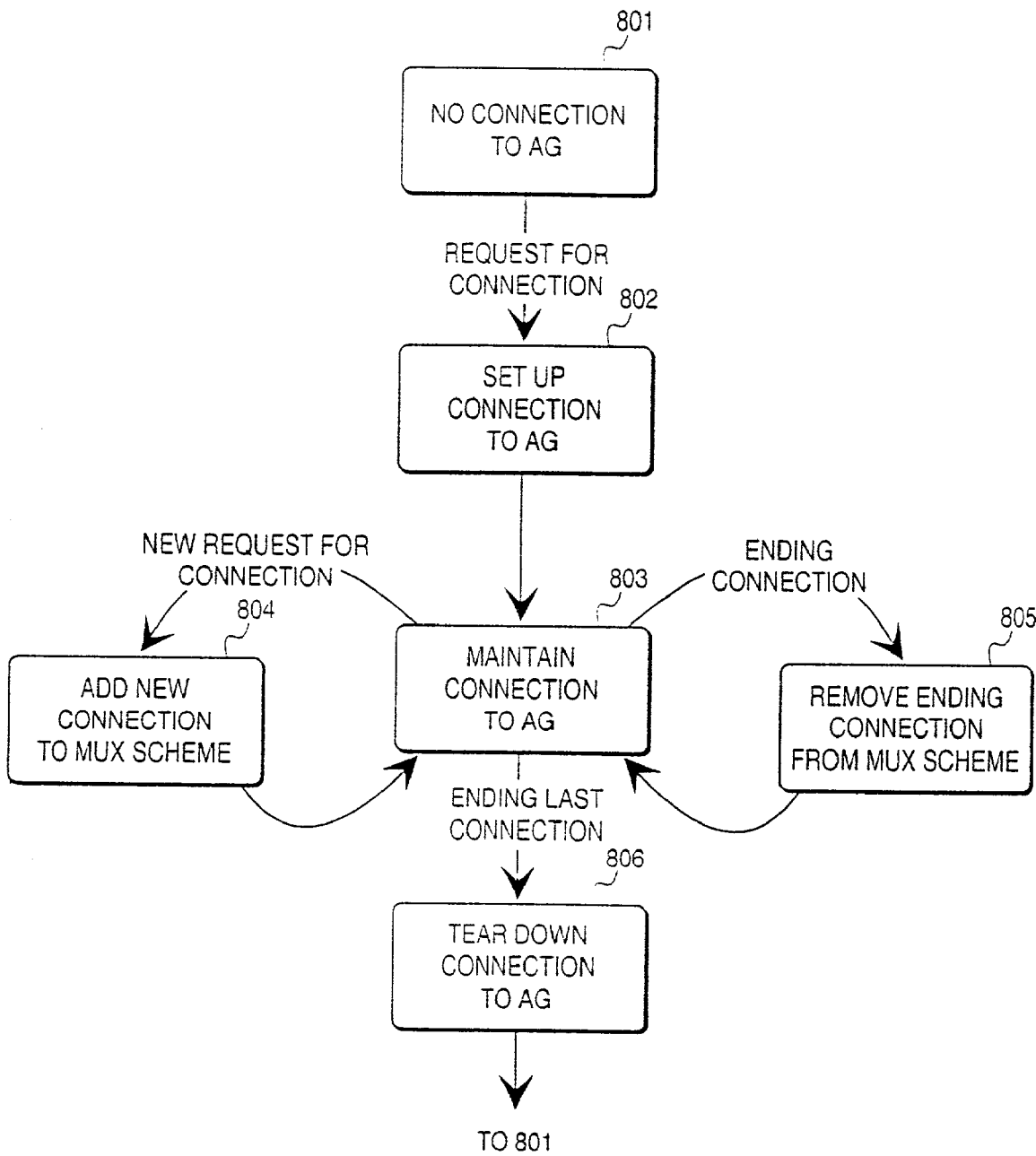
FIG. 8 illustrates the multiplexing of connections in a schematic state machine.

One efficient way for reducing overheads and performing bandwidth-optimization is the multiplexing of connections at the MU. Multiplexing concerns both requests from client applications and client proxy's internally originated requests, e.g. that for "active" caching. FIG. 8 is a state diagram that illustrates the aspects of connection multiplexing. When there are no active communications connections to the access gateway, the MU is in state 801. A request causes a transition to state 802, where the MU sets up a connection to the access gateway. Successfully setting up the connection is followed by an immediate transition to state 803, where the connection is maintained. If, during the period when the connection to the access gateway is active, there comes another request for another connection, a transition to state 804 occurs where the newly requested connection is added to a multiplexing scheme that the MU uses to multiplex all separately requested first protocol connections to a single second protocol connection. After the addition step 804 the MU returns to the steady state connection maintaining step 803. Similarly if during the period when the connection to the access gateway is active some first protocol connection is not needed any more, there occurs a transition to state 805 where the ending connection is removed from the multiplexing scheme, with immediate return to state 803. Only when the last remaining first protocol connection is found to be ending does there occur a transition to state 806 where the connection to the access gateway is ended. A natural consequence of such ending is a return to the completely idle state 801.

Structure and Operation of the Access Gateway

Figure 9:
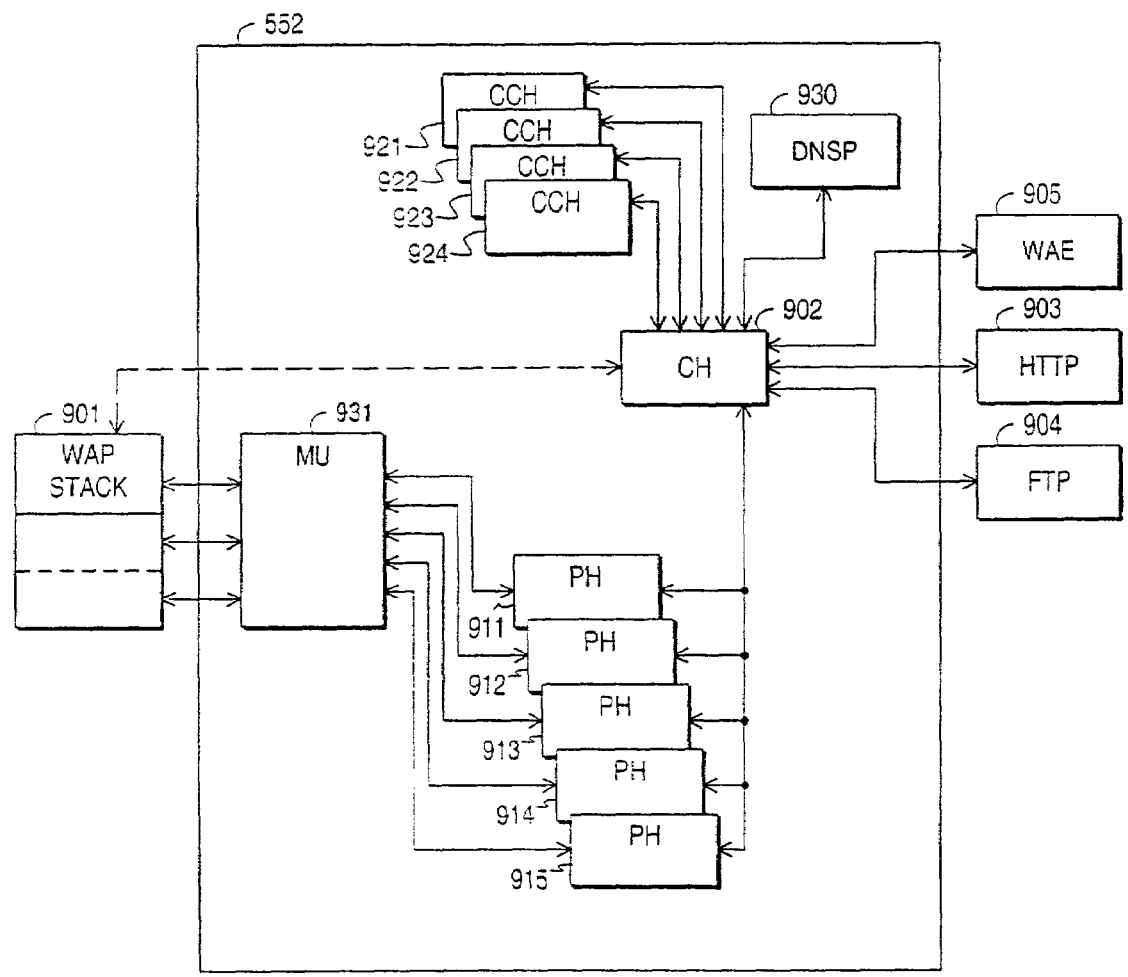
FIG. 9 illustrates an advantageous modular structure for the application layer of an access gateway and FIG. 10 illustrates the handling of a request at the access gateway according to an embodiment of the invention.

The most important part of the access gateway regarding operation according to the invention is the application layer 552 seen in FIG. 5. The other parts of the access gateway are basically just means for implementing protocol stacks that are known as such. FIG. 9 is a schematic block diagram of an access gateway's application layer 552. On the left in FIG. 9 there is the coupling to the bandwidth-optimized communications protocol stack, meaning here the WAP stack 901. A central part of the application layer 552 is again a CH (Communications Handler) 902, from which there are couplings to the representatives of other communications protocols on the right: the HTTP and FTP examples 903 and 904 have been already discussed previously. As another alternative there is a coupling from the CH 902 to a WAP Applications Environment 905. We will describe later the meaning and importance of this alternative. We may refer generally to the protocols on the right in FIG. 9 as the network protocols, because they are used for communications into the direction of various (fixed) networks.

Similarly as in the application layer of the client proxy, there are an MU and various PHs (Protocol Handlers) that are specific to those network protocols through which the CH 902 wishes to be able to communicate. PHs 911 to 915 and the MU 931 are shown in FIG. 9. Also the CCH concept is used in the access gateway, but instead of a single CCH there are multiple CCHs, four of which are shown as examples in FIG. 9 as 921–924. The reasoning behind using several parallel CCHs is that there may be a separate CCH for each individual client proxy that has registered itself at a certain access gateway, or group-specific CCHs each of which corresponds to a group of registered client proxies. The invention does not require several CCHs to be used at the access gateway, but having individual CCHs makes it easier to implement the (background) routines that aim at keeping the client proxies' CCHs up to date during active caching. Moreover, the difference between individual CCHs may be purely logical (they can all be stored in one physical database).

The application layer also contains a DNSP (Domain Name Server Proxy) 930, which is a local database that is used to map domain names to network addresses. Its purpose is to improve efficiency by avoiding requests to a remote DNS, in case when locally available information is sufficient for name resolving.

Figure 10A:
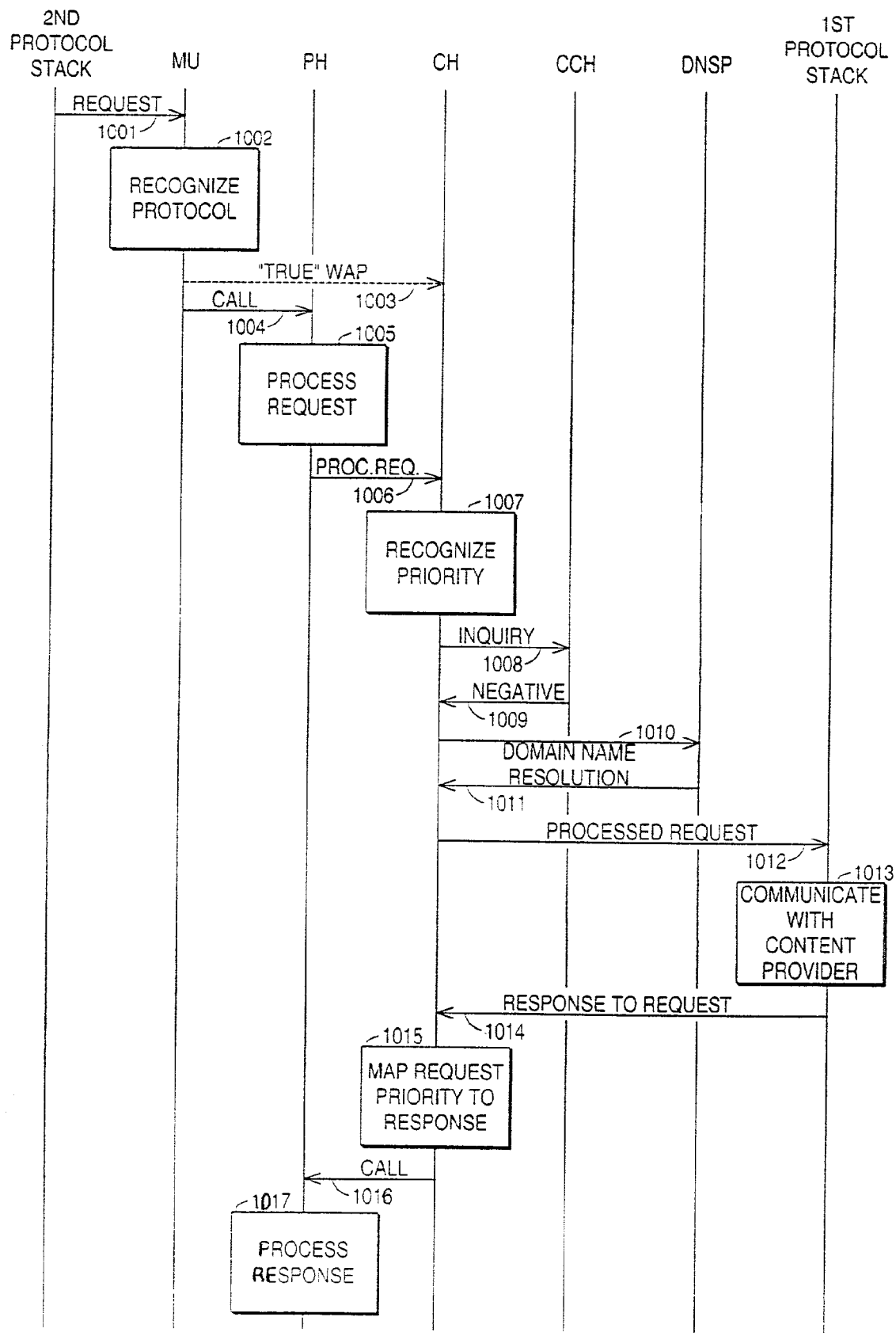
Figure 10B:
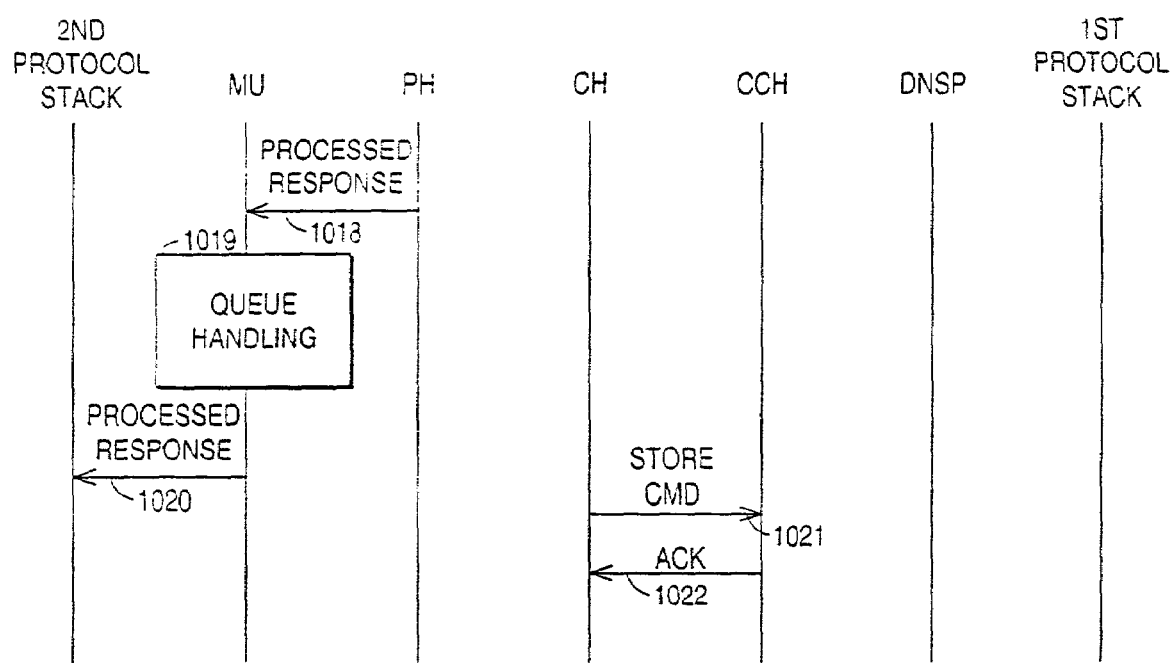

FIG. 10, which consists of FIGS. 10a and 10b together, illustrates the handling of an exemplary request 1001 that an access gateway receives from a client proxy through the second protocol (WAP) stack. At step 1002 the MU recognizes the request protocol and calls a corresponding PH at step 1004 to process the request, i.e. to reverse the processing that was made at a PH of the client proxy that is the originator of the request. The result of the processing 1005 at the PH is a processed request that is forwarded to the CH at step 1006.

Note that the MU is able of receiving requests not only from the top layer of the second protocol stack, but from inner layers, as well. For example, an FTP request from the client application will be passed to the MU immediately from WTP layer, but not via WSP layer. It should also be noted, that the MU is capable of recognizing "true" WAP requests. They are forwarded directly to the CH (shown by dashed line as step 1003).

At step 1007 the CH recognizes the processed request and the protocol that is to be used to forward it to a content provider's server. The CH also monitors the priority of every particular request and performs actions, which guarantee that the priority of the corresponding response is the same, as for the request.

It would be most expedient if the requested contents could be read locally from a CCH instead of forwarding the request to any other server through a network, so at step 1008 the CH sends an inquiry to the appropriate CCH. Here we assume that the CCH did not have the requested contents in store, as is illustrated by the negative response at step 1009. If the request contains a domain name or network location that necessitates a call to the local DNSP of the access gateway, this is made at step 1010 with the response of the DNSP shown as 1011.

At step 1012 the CH transmits the processed request to the selected protocol (HTTP, FTP, . . . ). Above said "true" WAP requests are directly forwarded to the WAE level without any further processing.

Step 1013 represents generally the actual communication with the content provider's server. A response is received through the first protocol (HTTP/TCP) stack at step 1014. At step 1015 the CH identifies, what request caused the received response, and assigns the response priority according to that of request.

In order to be able to send the response to the client proxy through the second protocol (WAP) stack, the CH must call again the appropriate PH at step 1016. The selected PH processes the response at step 1017 and forwards it to the MU at step 1018.

At step 1019 the MU performs actions needed for prioritizing connections, and then communicates the processed response to the appropriate level in the second protocol stack at step 1020. So the response is finally transmitted to the client proxy through the wireless communication connection. At step 1021 the CH commands the appropriate CCH to store the received contents according to the principle of caching, and at step 1022 the CH receives the acknowledgement.

It should be noted that the access gateway has by default a fixed high-capacity connection to at least one communications network, so exchanging information between it and content sources at various locations throughout the world is much easier and simpler and much less limited by bandwidth restrictions than transferring information over the wireless link to the client proxy. Also memory space is less scarce a resource at the access gateway than at the client proxy. This underlines the significance of active caching at the access gateway. After the strategy has been chosen that is to be adhered to in active caching, the access gateway follows the changes of content in the selected content sources that are subject to active caching and updates regularly the client proxy specific (or client proxy group specific) cache databases. Keeping the latters at the access gateway as up to date as possible gives maximal freedom for choosing the time and way in which low-priority (background) connections over the wireless link are established for updating corresponding cache databases at the client proxies.

Prioritizing Connections

Above it was explained how one of the advantageous functions of the client proxy is the multiplexing of several simultaneously active client application connections to a single wireless connection. As a first assumption each client application connection has equal priority regarding the multiplexing procedure, which means that every connection gets an equal share of the communications resources that the wireless connection represents. However, it may be advantageous to define, and store in association with the CH, various levels of priority so that as a part of the multiplexing procedure the CH evaluates the urgency of each client application request; so that a larger proportional portion of the available communications resources will be allocated to those connections, that serve the most urgent requests.

Handling the background processes that serve active caching is typically an ultimate example of prioritizing. The active caching requests from the CCH have so low priority that if there are any other requests that necessitate downloading information over the wireless connection, these are served first before any capacity is allocated to active caching.

The selection of priorities may follow a predetermined and fixed strategy that take into account e.g. the real-time nature of certain requests and the non-real-time nature of others. It is also possible to let a user set the priorities himself so that she can determine, what kind of connections should be served first.

Caching Strategies

Next we will analyze certain ways of achieving savings in the number of time-critical requests that must be forwarded from the CH to the wireless network connection. A time-critical request is, in a wide sense, a request for such information the most prompt arrival of which would be appreciated by the requesting client application. For example if a human user wants to examine a web page on a display, the faster the correct page appears the better. This wide sense of time-criticality covers also narrow interpretations according to which only requests concerning real time data are time-critical. Achieving said savings means that a certain number of time-critical requests may be satisfied by reading information locally from the CCH.

It might be assumed that a substantial number of users of network connections have a rather limited selection of frequented network locations. Additionally we may assume that the content that can be downloaded from these "favourite" locations changes only gradually. The "enhanced" caching strategy that is proposed to be used by the CCH comprises three main aspects: difference-, active- and predictive caching. In the structure of the access gateway it was mentioned that the access gateway maintains personalised caches of each registered client: any of said aspects as well as any combinations of them can be applied in maintaining such caches. Similarly any of said aspects as well as any combinations of them can be applied in maintaining a cache at the client proxy, or even a number of user-specific caches at the client proxy if there are multiple users using the same client proxy.

Difference caching means that the whole changed contents of a network location subject to caching are not reloaded from the network but only those parts of it where changes have occurred. Difference caching is mainly applicable in maintaining the cache(s) at the client proxy. The cache(s) at the access gateway downloads contents from the network in the way defined by the network server; at the priority date of this patent application it is not regarded as possible to ask for only a difference between a newest version and the one that the requester already has. However, according to the invention it is possible to influence the transfer between the access gateway and the client proxy, so it is feasible to perform difference caching by comparing both caches and sending only the difference between the version cached in the client proxy and the version cached in the access gateway. If needed, the latter will be (re)loaded to the access gateway from a content server prior to performing the comparison.

Active caching means that the CCH makes requests for downloading information from the access gateway without any client application directly requiring the information. An example of use of active caching can be a situation where the user specifies in the client proxy that he wants the latest version of a certain network resource to be always available on the client device at once.

Predictive caching differs from active caching in that the CCH additionally tries to predict at least a part of the network locations from which contents should be downloaded and forwarded to client applications in the near future. Predicting may be based on a variety of factors, such as observed frequency of use (the contents of a certain network location have been requested at least N times, where N is a positive integer), observed regularity in use (the contents of a certain network location have been requested at certain regularly repeated times), observed focus of interest (the relative portion of requests that concern contents of a certain type is large) and observed following of trends (the requests follow generally documented popularity statistics; the user wants to always check the entries on a latest "best of the web" list). The CCH implements predictive caching by either just storing the latest requested copy of the contents which it assumes to be requested again, or by regularly updating the predictively cached contents so that if and when a new request comes regarding a certain network location, the version that can be read directly from the CCH is never older than the length of the updating interval. Regular updating is most advantageously used when the predictions are based on observed regularity in use, so that the contents stored in the CCH are updated when the next occurrence of the observed regular use is approaching.

Generally caching could also be divided into two basic types: push and pull. In the present invention push type caching is a procedure where the CCH has subscribed as an active caching client of the access gateway regarding certain network locations, and every time when the access gateway becomes aware of a change of contents in one of these locations it automatically forwards the changed information to the client proxy's CCH. Pull type caching means that the CCH must always ask for the changed information. Pull type can be further classified into "regular" or "according to need", where the former becomes actually predictive caching because the CCH asks for the changed information even if no client application has recently requested it. Pull type caching according to need means that when a request comes from a client application, the CCH asks for the latest changed information from the access gateway so that the latest changes are combined with the unchanged information read from the CCH itself.

It is common to all active- and predictive caching requests that these are most advantageously performed as background processes so that the user does not need to know that they are taking place. Similarly they are most advantageously performed at times when ample bandwidth is available, e.g. during the night or when the communications capabilities of the client side are not currently used for something else like an ongoing telephone call.

The mobility of the client side also suggests that active- and predictive caching should take into account the current location of the user: e.g. when the user is at a location where a local high-speed network connection is available, cache can be updated. Another example is when a user is entering a cell that covers a shopping mall; in this case information regarding the products and services available in the mall could be predictively stored into the CCH.

Enhanced caching also implies that means are available for optimizing said caching strategies, in terms of e.g. communication connection cost or communication traffic volume. It is considered to be within the capability of a person skilled in the art to present methods of optimization once the prerequisites like taxing policies are known.

Caching may also follow a number of strategies regarding the grouping of clients and client proxies, or even individual users, to their respective caches. The most elaborate grouping alternative is to have a personalized cache and its corresponding caching strategy for each individual, identified user so that even if a number of users appear to use the same client proxy, they all have their personalized "cache accounts" at the access gateway. A slightly less complicated approach delegates the task of user-specific caching to the client proxy (which then in turn must have several logically separate cache memories instead of the single one referred to above) so that the access gateway only keeps a logically separate cache for each client proxy. Moving towards even simpler implementations, there comes the grouping of client proxies so that the access gateway does not perform logically separate caching for individual client proxies but only for client proxy groups. The simplest, trivial grouping alternative is the limiting case of the last-mentioned where all client proxies constitute a single group.

In all grouping alternatives except the simplest (trivial) one the search for certain requested contents may follow an expansive pattern: for example if user-specific caches have been defined but the cache reserved for a certain user does not contain the requested contents, the caches reserved for other users of the same client proxy are searched next, taking user access rights into account. If still no match is found, the search proceeds to the caches of other client groups and so on. The expansive searching strategy can be used in a smaller scale in the cache of the client proxy, if user-specific caches have been defined therein.

Coupling Other Kinds of (WAP) Wireless Clients to the Same Access Gateway

In the description above we have assumed that the client side that is to communicate with an access gateway has the overall structure shown in FIGS. 4 and 5, i.e. that there is a client side application that is designed for a non-bandwidth-optimized protocol stack and necessitates a protocol conversion according to the invention. However, it should be noted that the invention has an inherent advantage regarding service that can be given also to other kinds of clients. At the priority date of the invention there are numerous users of WAP phones and other WAP-based portable terminals: because the access gateway uses WAP as the protocol that constitutes the interface towards wireless terminals, it is actually irrelevant whether the client is of the type shown in FIGS. 4 and 5 or just a conventional "true" WAP client.

Extending the service of the access gateway to true WAP clients is the reason for having a direct coupling from the CH 902 to a WAE entity 905. If the request from the client side turns out to relate to true WAP functionality, the CH 902 just forwards it to the WAE entity 905 that takes care of the rest of the processing according to the known and documented practices of WAP.

Another feature of multi-service readiness is related to the fact that in the previous description we left it completely open what constitutes the lower layers 526 and 558 of FIG. 5. Depending on the wireless bearer technology that is to be used (e.g. GPRS, HSCSD or CSD) there may be different lower layer entities below the transport layer (the IP layer 525, 557) that can all be used by the same upper layers (without any changes in them) through appropriate interlayer connections.

Rate Adaptation and Portal Functionality at or Within Reach of the Access Gateway The access gateway is well aware of the fact that the requested contents will be transmitted to the client proxies over a bandwidth-restricted wireless link. Therefore it may implement various processing methods on the requested contents before transmitting them towards the client proxies. Above we have already referred to mainly protocol-specific measures like binary coding of headers. Additionally the access gateway may perform content-dependent processing such as deliberately sacrificing picture or sound quality by reducing the amount of picture or sound data, stripping bandwidth-intensive elements such as pictures or animations from the transmitted contents altogether, or removing redundancy if a higher level of transmission errors is accepted. These measures may be taken automatically or user-specifically only at an explicit consent of each user. Such processing may also be made dependent on predicted and/or measured link quality: when the current link data rate is high, the contents would be transmitted more or less in their original form, otherwise various degrees of stripping and/or compressing should be used.

Preparing or optimizing certain contents according to the capabilities of a user end device and/or according to link characteristics is often referred to as portal functionality. The access gateway may have this functionality as its own feature for example in one or several PHs, or it may communicate with a certain specific external portal device that is capable of producing optimized content pages. Requests from the access gateway to such an external portal device should indicate the requested amount and type of portal functionality, for example by citing the current wireless link data rate, referring to maximal or optimal content page sizes, or announcing the type of client side device that is to use the requested content page.

If the access gateway has obtained an identification of a user that is behind a certain request, it may apply portal functionality according to certain selections that the user has explicitly made previously. The access gateway may also automatically adapt its portal functionality according to certain identified user activity or user profile, so that changes are done into the content which is transmitted over the limited speed communications link.

Further Considerations

Because of the typically wireless nature of the limited speed communications link, the client proxy can never be sure beforehand without trying, whether the communications connection to the acees gateway is functioning properly or not. In addition to link failures there is also the uncertainty factor of the access gateway or a certain content-providing server possibly being temporarily in a state where it is simply not responding. The client proxy may be arranged to send occasional queries to the access gateway just to make sure that an active communication connection can be set up quickly if there comes a request that necessitated downloading of information from the access gateway.

The prioritization of connections over the limited speed communications link may be made dependent on certain telltale observations made at the client side. For example, if a browser program that a user uses to utilize network connections is run in a window, and this window is closed or reduced in size or otherwise found to be inactive, priorities of all connections that relate to that particular browser can automatically be lowered. Correspondingly observed increase in user activity (e.g. a reduced window being expanded again) may automatically cause priorities to be raised in order to prepare for potentially coming urgent requests.

The bandwidth-optimized protocol stack may be used for encrypting, authentication and/or similar add-on functions that add value to a communications connection. The invention allows encryption and/or authentication to be used between a variety of devices: encryption between the client proxy and the access gateway in either or both directions, encryption between the client proxy and a network server in either or both directions, encryption between the access gateway and a network server in either or both directions, authenticating the client proxy to the access gateway and/or vice versa, authenticating the client proxy to a network server and/or vice versa, authenticating the access gateway to a network server and/or vice versa.

In a situation where a client proxy has the possibility of communicating with several access gateways simultaneously, the selection of the access gateway that would most probably offer the service that matches best the needs of the user of the client proxy is possible; either manually by the user before establishing a network connection, or automatically by the client proxy during the process of establishing a connection. In establishing a network connection the client proxy may query for the address of the access gateway to be used either from the user or from a predetermined source within the network.

It may also happen that there are no access gateways available at all. Since a user would most probably appreciate even a slow wireless connection more than no wireless connection at all, the client side may go into a "non-AG" mode where the requests from client applications according to the first, non-bandwidth-optimized protocol stack are passed transparently on over the wireless connection to a the server application and responses are received from said server application as well according to the non-bandwidth-optimized protocol stack and passed on transparently to the appropriate client applications; in both actions the access gateway is bypassed. During the "non-AG" mode the client proxy should be regularly polling for active, available access gateways so that once one becomes available, bandwidth-optimized operation is resumed.

The invention claimed is:

1. An arrangement for transferring digital data over a limited-transmission-capacity communications link, comprising:
    a client side subarrangement, a server side subarrangement located at a different side of the limited-transmission-capacity communications link than the client side subarrangement,
    within the client side subarrangement, a client application arranged to receive and transmit digital data using a first communications protocol stack, and
    within the server side subarrangement, a server application arranged to receive and transmit digital data using the first communications protocol stack;
    within the client side subarrangement, a client proxy arranged to perform protocol conversions between the first communications protocol stack and a second communications protocol stack, and within the server side subarrangement, an access gateway arranged to perform protocol conversions between the first communications protocol stack and the second communications protocol stack; wherein:

said client proxy and said access gateway are arranged to convey transferred digital data between the client application and the server application so that, between said client proxy and said access gateway, digital data are transferred according to the second communications protocol stack, and said second communications protocol stack corresponds to a bandwidth efficiency that is higher than a bandwidth efficiency to which the first communications protocol stack corresponds.

2. An arrangement according to claim 1, wherein:

said client proxy comprises a first protocol stack arranged to correspond to the client application in its use of the first communications protocol stack, said client proxy comprises a second protocol stack arranged to correspond to said access gateway in its use of the second communications protocol stack, said client proxy comprises an application layer entity located on top of said first and second protocol stacks and arranged to process digital data during protocol conversions, said access gateway comprises a first protocol stack arranged to correspond to the server application in its use of the first communications protocol stack, said access gateway comprises a second protocol stack arranged to correspond to said client proxy in its use of the second communications protocol stack, and said access gateway comprises an application layer entity located on top of said first and second protocol stacks and arranged to process digital data during protocol conversions.

3. An arrangement according to claim 2, wherein the application layer entity of the client proxy comprises:

a connection handler arranged to handle the processing of requests and responses conveyed through the client proxy, coupled to said connection handler, a cache memory arranged to store previously handled digital data, and coupled to said connection handler, at least one protocol handler arranged to perform conversions between the first and second communications protocol stacks; and the application layer entity of the access gateway comprises;

a connection handler arranged to handle the processing of requests and responses conveyed through the access gateway, coupled to said connection handler, at least one cache memory arranged to store previously handled digital data, and coupled to said connection handler, at least one protocol handler arranged to perform conversions between the first and second communications protocol stacks.

4. An arrangement according to claim 3, wherein:

the application layer entity of the client proxy comprises, coupled to said connection handler, a number of protocol handlers each of which is arranged to perform conversions between a different first communications protocol and the second communications protocol stack, and the application layer entity of the access gateway comprises, coupled to said connection handler, a number of protocol handlers each of which is arranged to perform conversions between a different first communications protocol and the second communications protocol stack.

5. An arrangement according to claim 3, comprising multiplexing means at both the application layer entity of the client proxy and the application layer entity of the access gateway, said multiplexing means being arranged to multiplex several logically separate connections between the client proxy and the access gateway into a single connection therebetween.

6. An arrangement according to claim 1, wherein the first communications protocol stack is a combination of HTTP over TCP/IP and the second communications protocol stack is WAP.

7. A client side arrangement for transferring digital data over a limited-transmission-capacity communications link in communication with a server side arrangement located at a different side of the limited-transmission-capacity communications link than the client side arrangement, the client side arrangement comprising:

a client application arranged to receive and transmit digital data using a first communications protocol stack, and a client proxy arranged to perform protocol conversions between the first communications protocol stack and a second communications protocol stack;

wherein said client proxy is arranged to convey transferred digital data between the client application and the server side arrangement so that between said client proxy and said server side arrangement digital data are transferred according to the second communications protocol stack, and said second communications protocol stack corresponds to a bandwidth efficiency that is higher than a bandwidth efficiency to which the first communications protocol stack corresponds.

8. A client side arrangement according to claim 7, wherein:

said client proxy comprises a first protocol stack arranged to correspond to the client application in its use of the first communications protocol stack, said client proxy comprises a second protocol stack arranged to correspond to the server side arrangement in its use of the second communications protocol stack, and said client proxy comprises an application layer entity located on top of said first and second protocol stacks and arranged to process digital data during protocol conversions.

9. A client side arrangement according to claim 8, wherein the application layer entity of the client proxy comprises:

a connection handler arranged to handle the processing of requests and responses conveyed through the client proxy, coupled to said connection handler a cache memory arranged to store previously handled digital data, and coupled to said connection handler at least one protocol handler arranged to perform conversions between the first and second communications protocol stacks.

10. A client side arrangement according to claim 9, wherein:

the application layer entity of the client proxy comprises, coupled to said connection handler, a number of protocol handlers each of which is arranged to perform conversions between a different first communications protocol and the second communications protocol stack.

11. A client side arrangement according to claim 9, wherein:
the application layer entity of the client proxy comprises multiplexing means for multiplexing several logically separate connections between the client proxy and the server side arrangement into a single connection therebetween.

12. A client side arrangement according to claim 11, wherein:
the client proxy is arranged to assign priorities to logically separate connections multiplexed by said multiplexing means, said priorities being based on at least one of the following: observed user activity, explicitly stated preferences of a user, contents for the transferring of which the connections are used.

13. A client side arrangement according to claim 9, wherein:
said cache memory comprises a number of logically separate cache memories,
the separation of said cache memory into logically separate cache memories is based on at least one of the following: user, user group, type of information stored,
the client proxy is arranged to conduct an expansive search through logically separate cache memories in order to look for certain requested digital data from other logically separate cache memories if that requested digital data was not found in a particular one of said logically separate cache memories, and
in conducting said expansive search, the client proxy is arranged to take into account existing access rights of a requesting party requesting said requested digital data.

14. A client side arrangement according to claim 9, wherein in using said cache memory said client proxy is arranged to apply at least one of:
an active caching algorithm designed for proactively preparing for a future need of certain digital data by the client application,
a predictive caching algorithm designed for predicting certain network locations from which contents should be downloaded and forwarded to the client application at some future moment of time,
a difference caching algorithm designed for reloading from a network only those parts of previously stored contents where changes have occurred,
an optimizing caching algorithm designed for optimizing, with respect to a limiting factor such as communication cost or amount of radio traffic, the amount and/or form of contents that should be downloaded from a network, and
a processing algorithm designed to improve response time by processing digital data stored in said cache memory prior to receiving an explicit request for such digital data from a client application.

15. A client side arrangement according to claim 7, wherein the first communications protocol stack is a combination of HTTP over TCP/IP and the second communications protocol stack is WAP.

16. A client side arrangement according to claim 7, wherein the client application and said client proxy are arranged to operate within a single physical device.

17. A client side arrangement according to claim 7, wherein the client application and said client proxy are arranged to operate within at least two physically separate devices.

18. A client side arrangement according to claim 7, wherein:
in a situation where a communications connection according to said second communications protocol stack with an access gateway at said server side arrangement is temporarily impossible, said client proxy is arranged to convey transferred digital data between the client application and a server application at the server side arrangement according to the first communications protocol stack.

19. A client side arrangement according to claim 18, wherein
during a term of conveying transferred digital data between the client application and said server application at the server side arrangement according to the first communications protocol stack, said client proxy is arranged to repeatedly attempt resuming a communications connection according to said second communications protocol stack with an access gateway at the server side arrangement.

20. A server side arrangement for transferring digital data over a limited-transmission-capacity communications link in communication with a client side arrangement located at a different side of the limited-transmission-capacity communications link than the server side arrangement, the server side arrangement comprising:
a server application arranged to receive and transmit digital data using a first communications protocol stack, and
an access gateway arranged to perform protocol conversions between the first communications protocol stack and a second communications protocol stack; wherein said access gateway is arranged to convey transferred digital data between the client side arrangement and the server application so that, between said client side arrangement and said access gateway, digital data are transferred according to the second communications protocol stack, and said second communications protocol stack corresponds to a bandwidth efficiency that is higher than a bandwidth efficiency to which the first communications protocol stack corresponds.

21. A server side arrangement according to claim 20, wherein:
said access gateway comprises a first protocol stack arranged to correspond to the server application in its use of the first communications protocol stack,
said access gateway comprises a second protocol stack arranged to correspond to the client side arrangement in its use of the second communications protocol stack, and
said access gateway comprises an application layer entity located on top of said first and second protocol stacks and arranged to process digital data during protocol conversions.

22. A server side arrangement according to claim 21, wherein the application layer entity of the access gateway comprises:
a connection handler arranged to handle the processing of requests and responses conveyed through the access gateway,
coupled to said connection handler at least one cache memory arranged to store previously handled digital data, and coupled to said connection handler at least one protocol handler arranged to perform conversions between the first and second communications protocol stacks.

23. A server side arrangement according to claim 22, wherein:
the application layer entity of the access gateway comprises, coupled to said connection handler, a number of protocol handlers each of which is arranged to perform conversions between a different first communications protocol and the second communications protocol stack.

24. A server side arrangement according to claim 22, wherein:
the application layer entity of the access gateway comprises multiplexing means for multiplexing several logically separate connections between the access gateway and the client side arrangement into a single connection therebetween.

25. A server side arrangement according to claim 22, wherein:
the application layer entity of the access gateway comprises, coupled to said connection handler, a number of logically separate cache memories, the separation into logically separate cache memories is based on at least one of the following: user, user group, client, client group, type of information stored,
the access gateway is arranged to conduct an expansive search through logically separate cache memories in order to look for certain requested digital data from other logically separate cache memories if that requested digital data was not found in a particular one of said logically separate cache memories, and
in conducting said expansive search, the access gateway is arranged to take into account existing access rights of a requesting party requesting said requested digital data.

26. A server side arrangement according to claim 22, wherein in using said at least one cache memory said access gateway is arranged to apply at least one of:
an active caching algorithm designed for proactively preparing for a future need of certain digital data by the client side arrangement,
a predictive caching algorithm designed for predicting certain network locations from which contents should be downloaded and forwarded to the client side arrangement at some future moment of time,
a first optimizing caching algorithm designed for optimizing, with respect to a limiting factor such as communication cost or amount of radio traffic, the amount and/or form of contents that should be forwarded to the client side arrangement,
a second optimizing caching algorithm designed for optimizing, with respect to a limiting factor such as communication cost or amount of network traffic, the amount and/or form of contents that should be reloaded from a network, and
a processing algorithm designed to improve response time by processing digital data stored in said at least one cache memory prior to receiving an explicit request for such digital data from a client side arrangement.

27. A server side arrangement according to claim 22, wherein the application layer entity of the access gateway comprises a coupling between said connection handler and an application layer protocol entity of the second communications protocol stack.

28. A server side arrangement according to claim 22, wherein the server application and said access gateway are arranged to operate within a single physical device.

29. A server side arrangement according to claim 22, wherein the server application and said access gateway are arranged to operate within at least two physically separate devices.

30. A method for transferring digital data over a limited-transmission-capacity communications link where a client aide subarrangement and a server side subarrangement are located at different sides of the limited speed communications link, and within the client side subarrangement a client application is arranged to receive and transmit digital data using a first communications protocol stack and within the server side subarrangement a server application is arranged to receive and transmit digital data using the first communications protocol stack, the method comprising the steps of:
conveying transferred digital data between the client application and the server application through a client proxy within the client side subarrangement and an access gateway within the server side subarrangement,
performing in said client proxy protocol conversions between the first communications protocol stack and a second communications protocol stack that corresponds to a bandwidth efficiency that is higher than a bandwidth efficiency to which the first communications protocol stack corresponds, and
performing in said access gateway protocol conversions between the first communications protocol stack and the second communications protocol stack; so that between said client proxy and said access gateway digital data are transferred according to the second communications protocol stack.

31. A method according to claim 30, comprising the steps of: a) routing a request received at the client proxy from the client application upwards through a first protocol stack into an application layer entity,
b) processing the request at the application layer entity of the client proxy,
c) if the processing of step b) reveals a need for communicating with the server side subarrangement, forwarding a processed request from the application layer entity of the client proxy downwards through a second protocol stack to the server side subarrangement, receiving a response from the server side subarrangement upwards through the second protocol stack and processing said response at the application layer entity of the client proxy; and
d) transmitting to the client application a response to the request received at step a), the transmission of said response going from the application layer entity of the client proxy downwards through the first protocol stack.

32. A method according to claim 31, wherein step b) comprises the substeps of:
b1) inquiring, whether the request received at step a) could be responded to by reading digital data from a cache memory at the application layer entity of the client proxy,
b2) if a positive response is received to the inquiry of step b1), proceeding to step d) without executing step c) because the processing of step b) did not reveal a need for communicating with the server side subarrangement; and
b3) if a negative response is received to the inquiry of step b1), calling a protocol handler at the application layer entity of the client proxy to process the request received at step a) into a form that accords with a protocol of the second communications protocol stack, and proceeding to execute step c).

33. A method according to claim 32, additionally comprising the steps of:
- handling said cache memory as a number of logically separate cache memories on the basis of at least one of the following: user, user group, type of information stored,
- conducting at the client proxy an expansive search through logically separate cache memories in order to look for certain requested digital data from other logically separate cache memories if that requested digital data was not found in a particular one of said logically separate cache memories, and in conducting said expansive search, the client proxy taking into account existing access rights of a requesting party requesting said requested digital data.

34. A method according to claim 32, additionally comprising at least one of the steps of:
- actively updating digital data stored in said cache memory by applying an active caching algorithm designed for proactively preparing for a future need of certain digital data by the client application,
- predictively updating digital data stored in said cache memory by applying a predictive caching algorithm designed for predicting certain network locations from which contents should be downloaded and forwarded to the client application at some future moment of time,
- partially updating digital data stored in said cache memory by applying a difference caching algorithm designed for reloading from a network only those parts of previously stored contents where changes have occurred,
- optimizing the process of downloading digital data from a network by applying an optimizing caching algorithm designed for optimizing, with respect to a limiting factor such as communication cost or amount of radio traffic, the amount and/or form of contents that should be downloaded from a network, and
- processing digital data stored in said cache memory by applying a processing algorithm designed to improve response time by processing digital data stored in said cache memory prior to receiving an explicit request for such digital data from a client application.

35. A method according to claim 34, wherein in cases where at least one of the active-, predictive- or difference caching algorithms is applied, downloading from a network for the purposes of such applied algorithm is at least partly implemented through a background communication connection to the server side subarrangement, so that said background communication connection has a different priority in resource allocation than potentially occurring simultaneous service to requests from the client application.

36. A method according to claim 34, wherein in cases where at least one of the active-, predictive- or difference caching algorithms is applied, downloading from a network for the purposes of such applied algorithm is at least partly implemented through cost-optimized communication connections to the server side subarrangement, so that communication connections for the purposes of active caching are made during terms when communication cost is lower than a certain normal cost.

37. A method according to claim 34, wherein in cases where at least one of the active-, predictive- or difference caching algorithms is applied, downloading from a network for the purposes of such applied algorithm is at least partly implemented through traffic-optimized communication connections to the server side subarrangement, so that communication connections for the purposes of active caching are made during terms when other communications traffic with the server side subarrangement is lower than a certain normal value.

38. A method according to claim 32, additionally comprising the steps of
- updating digital data stored in said cache memory by generating and processing an internal request;
- forwarding the processed internal request from the application layer entity of the client proxy downwards through a second protocol stack to the server side subarrangement,
- receiving a response from the server side subarrangement upwards through the second protocol stack,
- processing said response at the application layer entity of the client proxy and
- storing digital data extracted from said response to said cache memory.

39. A method according to claim 31, wherein step c) comprises the substep of selecting a particular access gateway among a number of available access gateways at a number of available server side subarrangements, the selection being based on at least one of the following: preconfigured information identifying a default access gateway, a dynamically obtained response to a query presented to a user, a dynamically obtained response to a query presented to a source within a network.

40. A method according to claim 31, wherein step c) comprises the substeps of:
- encrypting said request from the application layer entity of the client proxy to the server side subarrangement before transferring the request over a limited-transmission-capacity communications link,
- decrypting said request from the application layer entity of the client proxy to the server side subarrangement after transferring the request over a limited-transmission-capacity communications link,
- encrypting said response from the server side subarrangement to the application layer entity of the client proxy before transferring the response over a limited-transmission-capacity communications link, and
- decrypting said response from the server side subarrangement to the application layer entity of the client proxy after transferring the response over a limited-transmission-capacity communications link.

41. A method according to claim 31, wherein step c) comprises at least one of the substeps of:
- authenticating the client proxy for at least one device at the server side subarrangement, and
- authenticating at least one device at the server side subarrangement for the client proxy.

42. A method according to claim 31, wherein step c) comprises the substep of
- checking, whether other essentially simultaneous transmissions occur between the application layer entity of the client proxy and the server side subarrangement, and if so,
- multiplexing the processed request that is forwarded from the application layer entity of the client proxy towards the server side subarrangement into a single connection with the other essentially simultaneous transmissions.

43. A method according to claim 31, wherein step c) comprises the substeps of:
- c1) routing a request received at the access gateway from the client side subarrangement upwards through the second protocol stack into an application layer entity,
- c2) processing the request at the application layer entity of the access gateway, c3) if the processing of step c2) reveals a need for communicating with a content provider, forwarding a processed request from the application layer entity of the access gateway downwards through the first protocol stack to a content provider, receiving a response from the content provider upwards through the first protocol stack and processing said response at the application layer entity of the access gateway; and c4) transmitting to the client side subarrangement a response to the request received at step c1), the transmission of said response going from the application layer entity of the access gateway downwards through the second protocol stack.

44. A method according to claim 43, wherein step c2) comprises the substeps of:

c2/1) inquiring, whether the request received at step c1) could be responded to by reading digital data from a cache memory at the application layer entity of the access gateway, c2/2) if a positive response is received to the inquiry of step c2/1), proceeding to step c4) without executing step c3) because the processing of step c2) did not reveal a need for communicating with a content provider; and c2/3) if a negative response is received to the inquiry of step c2/1), calling a protocol handler at the application layer entity of the access gateway to process the request received at step c1) into a form that accords with a protocol of the first communications protocol stack, and proceeding to execute step c3).

45. A method according to claim 44, additionally comprising the steps of:

handling said cache memory as a number of logically separate cache memories on the basis of at least one of the following: user, user group, client, client group, type of information stored, conducting at the access gateway an expansive search through logically separate cache memories in order to look for certain requested digital data from other logically separate cache memories if that requested digital data was not found in a particular one of said logically separate cache memories, and in conducting said expansive search, taking into account existing access rights of a requesting party requesting said requested digital data.

46. A method according to claim 44, additionally comprising at least one of the steps of:

actively updating digital data stored in said cache memory by applying an active caching algorithm designed for proactively preparing for a future need of certain digital data by the client side subarrangement, predictively updating digital data stored in said cache memory by applying a predictive caching algorithm designed for predicting certain network locations from which contents should be downloaded and forwarded to the client side subarrangement at some future moment of time, optimizing the process of forwarding digital data to the client side subarrangement by applying a first optimizing caching algorithm designed for optimizing, with respect to a limiting factor such as communication cost or amount of radio traffic, the amount and/or form of contents that should be forwarded to a client side subarrangement, optimizing the process of downloading digital data from a network by applying a second optimizing caching algorithm designed for optimizing, with respect to a limiting factor such as communication cost or amount of network traffic, the amount and/or form of contents that should be downloaded from a network, and processing digital data stored in said cache memory by applying a processing algorithm designed to improve response time by processing digital data stored in said at least one cache memory prior to receiving an explicit request for such digital data from a client side subarrangement.

47. A method according to claim 43, wherein the processing of a response at the application layer entity of the access gateway as a part of step c3) comprises adapting certain contents of the response for transmission over a limited speed communication link to a client side subarrangement, thus implementing portal functionality.

48. A method according to claim 47, wherein said adapting comprises at least one of the following:

adding information to the response, removing information from the response, replacing information in the response.

49. A method according to claim 47, wherein said adapting is made dynamically according to link conditions between the server side subarrangement and the client side subarrangement.

50. A method according to claim 47, wherein said adapting is made according to certain previously obtained knowledge about certain capabilities of the client side subarrangement.

51. A method according to claim 47, wherein said adapting is made according to certain previously obtained knowledge about certain explicitly expressed preferences of an identified user of the client side subarrangement.

52. A method according to claim 47, wherein said adapting is made according to certain previously obtained knowledge about certain revealed behavior of an identified user of the client side subarrangement.

* * * * *

UNITED STATES PATENT AND TRADEMARK OFFICE
CERTIFICATE OF CORRECTION

PATENT NO. : 7,162,535 B2 Page 1 of 1
APPLICATION NO. : 10/099296
DATED : January 9, 2007
INVENTOR(S) : Kustov et al.

It is certified that error appears in the above-identified patent and that said Letters Patent is hereby corrected as shown below:

At column 15, line 59, please delete the word "acees" and replace it with --access--.

At column 16, line 43, please remove the word "a" which appears after the word "to".

Signed and Sealed this

Sixth Day of May, 2008

JON W. DUDAS
*Director of the United States Patent and Trademark Office*